(12) United States Patent
Koshkarian et al.

(10) Patent No.: US 6,562,409 B2
(45) Date of Patent: May 13, 2003

(54) METHOD FOR FORMING A RARE EARTH SILICATE COATING ON A SILICON BASED CERAMIC COMPONENT BY CONTROLLED OXIDATION FOR IMPROVED CORROSION RESISTANCE

(75) Inventors: Kent A. Koshkarian, Peoria, IL (US); Seung K. Lee, Peoria, IL (US); Michael J. Readey, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/054,055

(22) Filed: Jan. 22, 2002

(65) Prior Publication Data

US 2002/0063118 A1 May 30, 2002

Related U.S. Application Data

(62) Division of application No. 09/411,521, filed on Oct. 4, 1999, now abandoned.

(51) Int. Cl.[7] ................................................. B05D 3/02
(52) U.S. Cl. ................ 427/376.2; 427/314; 427/397.7; 427/399
(58) Field of Search ............................... 427/314, 327, 427/397.7, 376.2, 399

(56) References Cited

U.S. PATENT DOCUMENTS

| | | |
|---|---|---|
| 3,824,120 A | 7/1974 | Davidge et al. |
| 4,383,958 A | 5/1983 | Moschetti et al. |
| 4,400,427 A | 8/1983 | Moschetti et al. |
| 4,502,983 A | 3/1985 | Omori et al. |
| 4,628,039 A | 12/1986 | Mizutani et al. |
| 4,713,302 A * | 12/1987 | Komatsu ................... 427/419.1 |
| 4,904,624 A * | 2/1990 | Yeckley ....................... 264/604 |
| 5,096,859 A | 3/1992 | Sakai et al. |
| 5,118,644 A * | 6/1992 | Watanabe et al. ............. 501/80 |
| 5,178,809 A | 1/1993 | Takahashi et al. |
| 5,578,349 A | 11/1996 | Koshkarian et al. |
| 5,593,607 A | 1/1997 | Dam et al. |
| 5,620,645 A | 4/1997 | Crumpacker et al. |
| 5,695,700 A * | 12/1997 | Takeuchi et al. ............... 264/42 |
| 5,809,957 A | 9/1998 | Antone et al. |

FOREIGN PATENT DOCUMENTS

| | | |
|---|---|---|
| DE | 19712918 | 9/1998 |
| EP | 0 457 618 A2 | 11/1991 |
| JP | 09-40464 | 2/1997 |
| JP | 10-87364 | 4/1998 |
| JP | 10-87386 | 4/1998 |
| JP | 11-139883 | 5/1999 |
| JP | 11278968 | 10/1999 |
| WO | WO 92/19565 | 11/1992 |
| WO | WO 99/55640 | 11/1999 |

* cited by examiner

*Primary Examiner*—Michael Barr
(74) *Attorney, Agent, or Firm*—Kathleen R Carey; Finnegan & Henderson; Robert J Hampsch

(57) ABSTRACT

A low cost process for self-forming a uniformly adherent protective rare earth silicate coating on a silicon-based ceramic component for protecting the component against corrosive/erosive environments. The coating is self-formed by an oxidation process of a silicon-based ceramic associated with a reaction between a silica ($SiO_2$) film layer on the surface of silicon-based ceramic and the rare earth oxide existing inside of silicon-based ceramic component.

13 Claims, 2 Drawing Sheets

METHOD FOR FORMING A RARE EARTH SILICATE COATING ON A SILICON BASED CERAMIC COMPONENT BY CONTROLLED OXIDATION FOR IMPROVED CORROSION RESISTANCE

This application is a divisional of Ser. No. 09/411,521, filed Oct. 4, 1999, now abandoned.

TECHNICAL FIELD

The present invention relates generally to a ceramic component coated with a corrosion inhibiting material and more particularly, to a process for making a silicon-based ceramic component with a rare earth coating.

BACKGROUND ART

In the operation of gas and diesel engines that are adapted for utilizing alternative fuels, for example, methanol, ethanol, natural gas, the use of ceramic components, such as glow plugs, turbochargers, and turbine blades, are well known. It is well known that such engine components have a less than desirable service life owing to the harsh environment in the engine due to elevated temperatures.

Particularly, in diesel engines, it is also well known that a glow plug is used to beneficially assist the ignition of the non-autoignitable fuel during start-up as well as during operation. Such glow plugs also have a less than desirable service life owing to the harsh environment in the combustion chamber due to elevated temperatures.

Where the heating portion of a glow plug is formed of a silicon-based ceramic, and more particularly, silicon nitride ($Si_3N_4$), the service life of the heating portion of the glow plug is further reduced due to thermal stresses, oxidation and corrosion. The operating longevity of a silicon-based ceramic glow plug is further compromised when it is utilized in a diesel engine that is burning fuel other than diesel fuel.

When a silicon-based ceramic glow plug is utilized to assist in the ignition of non-autoignitable fuels at the elevated temperatures needed to sustain fuel combustion, the silicon-based ceramic undergoes severe corrosion and erosion due in part to the presence of impurities such as sodium, calcium, magnesium and sulfur introduced by the fuel and the lubrication oil. At high temperatures, these impurities react with the normally stable silica ($SiO_2$) film layer on the silicon-based ceramic surface to form compounds, such as sodium sulfate ($Na_2SO_4$), having a lower melting temperature than silicon-based ceramic, which are progressively eroded away by fuel and air spray.

Coatings are utilized to increase the corrosion and erosion resistance on engine components utilizing alternative fuels. Deposition of coatings on these engine components, such as glow plugs, are well know in the art and are of various constructions with a multiplicity of different materials. The prior art processes employed either a physical vapor deposition (PVD), a chemical vapor deposition (CVD), or plasma spray process.

These, heretofore, utilized processes had many inherent deficiencies. Among the many deficiencies, in particular, they were expensive and required several steps to form an adherent, uniform coating. An example of such a coating on a glow plug, formed by a deposition process, is found in U.S. Pat. No. 5,578,349, filed Nov. 30, 1995, and issued to Kent A. Koshkarian et al. on Nov. 26, 1996 and assigned to Caterpillar Inc.

It is desirable to provide the surface of a component with a protective coating that is not attacked by the impurities in the combustion environment and, thus, inhibits the corrosion and/or erosion mechanism. It is also desirable that the protective coating have very good adhesion to the component surface. It is further desirable that the protective coating have uniform continuity across the surface of the component to provide uniform corrosion and erosion protection. Finally, it is desirable to utilize a simple, low cost process to form a ceramic component with a protective coating.

The present invention is directed to overcome one or more of the problems as set forth above.

DISCLOSURE OF THE INVENTION

This invention applies to a silicon-based component in a corrosive environment. The silicon-based component has a rare earth silicate coating in the range of about 1.0 microns and 5.0 microns.

In another aspect of the invention, a process is provided for a silicon-based ceramic component, preferably a silicon nitride component, with a corrosion inhibiting coating material. The component is oxidized by heating the component at a temperature greater than 1250 degrees C. The rare earth oxide, which oxidizes over time at high temperature, is originally contained in the silicon-based ceramic component.

Upon heating, the rare earth oxide migrates to the surface of the ceramic component during the oxidation reaction and further reacts with the silica ($SiO_2$) film layer on the silicon-based ceramic component. The rare earth oxide in the rare earth oxide-doped ceramic component and the silica film layer form a rare earth silicate. Thus, the rare earth silicate coating layer is self-formed from the reaction.

BEST MODE FOR CARRYING OUT THE INVENTION

By the use herein of the term "uniform" to qualify the coating, it is meant that the thickness of the coating is essentially constant over the entire coated glow plug portion.

By the use herein of the term "continuous" to qualify the coating, it is meant that the coating covers the entire surface of the ceramic engine component without any voids, thereby effectively sealing the engine component against corrosion/erosion. This self-forming coating process can be applicable to other silicon-based ceramics such as silicon carbide (SiC), molybdenum disilicide ($MoSi_2$), and the like.

By the use herein of the term "rare earth silicates," it is meant coatings to include ytterbium silicate, lanthanum silicate, yttrium silicate, and the like.

By the use herein of the term "engine component" it is meant any part of an internal combustion engine, including but not necessarily limited to the combustion, fuel delivery, power transfer, cooling, lubrication, and turbocharging functions.

By the use herein of the term "alternative fuels", it is meant fuels other than diesel fuel, for example, methanol, ethanol, natural gas, and mixtures thereof.

Figure 1:
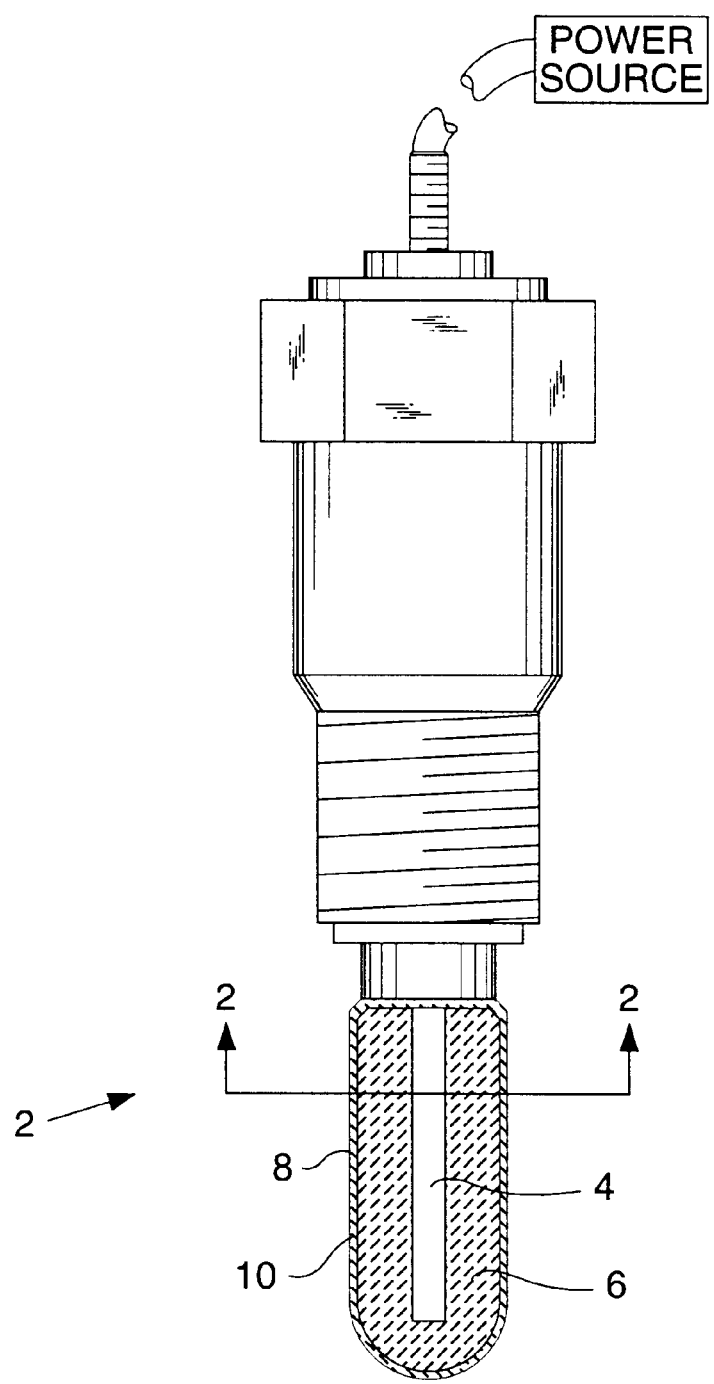
FIG. 1 is a diagrammatic view of a partial section of a coated glow plug of this invention.
Figure 2:
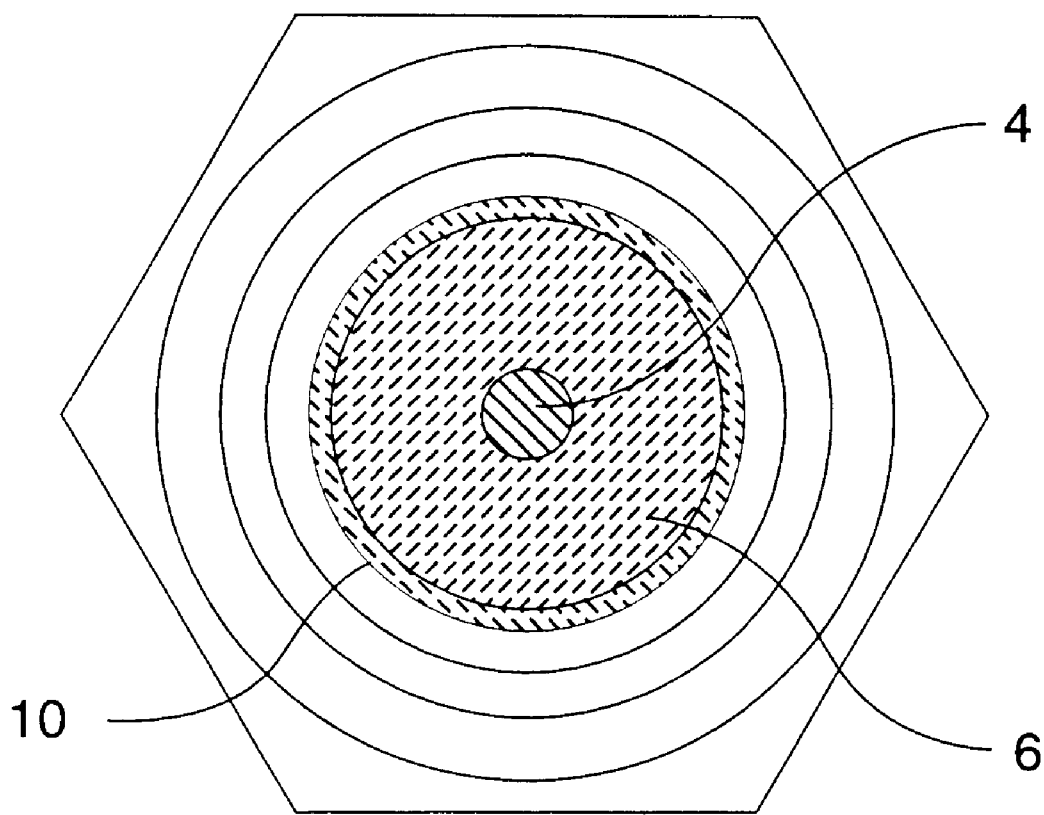
FIG. 2 is a cross-sectional view of a coated article in accordance with the present invention.

Referring to FIGS. 1 and 2, which depict the preferred embodiment, a glow plug 2, as is well known in the art, has a heating element 4 and a silicon-based ceramic tip 6 having an outer surface 8. These well known glow plugs 2 have controls (not shown) for heating the heating element 4, which heat passes outwardly to and through the glow plug tip 6 and into contact with fuel passing into the combustion chamber. During engine operation, the controlling element monitors the temperature of a portion of the glow plug 2 and maintains the temperature within a preselected temperature range.

In the glow plug 2 of this invention, a low porosity refractory rare earth silicate coating 10, preferably ytterbium silicate ($Yb_2Si_2O_7$), covers at least a portion, preferably all, of the silicon-based ceramic tip outer surface 8.

Preferably, the coating 10 has a thickness in the range of about 1.0 and 5.0 microns. Thickness less than about 1.0 micron is undesirable because the coating may not be sufficiently dense to seal the silicon-based ceramic tip from the combustion environment, and thickness greater than about 5.0 microns is undesirable because such coatings would have high thermal stresses and act as a thermal barrier to the heat flowing from the heating element and thereby represent a waste of time, labor, equipment, and natural resources since further thickness of the coating 10 provides no beneficial advantage. The coating 10 can be made on the glow plug tip 6 by the oxidation process described herein.

In the preferred process of this invention, a ceramic glow plug is made having a ytterbium silicate ($Yb_2Si_2O_7$) coating to protect the glow plug from the detrimental effects of corrosion and/or erosion resulting from the contact of the glow plug portion with the pressure, temperature and corrosive gases and liquids emitted when utilizing the glow plug in a diesel engine using alternative fuels.

Particularly, a silicon-based ceramic, preferably silicon nitride ($Si_3N_4$), glow plug portion undergoes severe corrosion and erosion due in part to the presence of impurities such as sodium, calcium, magnesium and sulfur introduced by the fuel and the lubrication oil. In the preferred embodiment of this invention, the deposition of a uniformly continuous and adherent coating of ytterbium silicate over the silicon nitride surface prevents these impurities from reacting with the silicon nitride surface.

The uniformly dense, continuous rare earth silicate coating, as formed by the process of this invention, prevents these impurities from forming compounds such as sodium sulfate ($Na_2SO_4$), magnesium sulfate ($MgSO_4$), and the like, which have a lower melting temperature than silicon-based ceramic and which are progressively eroded away by fuel and air spray, in the absence of such a coating.

The coating process consists of oxidizing a silicon-based ceramic, preferably silicon nitride, glow plug at high temperatures (above 1250 degrees C.). The rare earth silicate coating layer is self-formed on the surface of the glow plug by the oxidation process associated with reaction between silica and the rare earth oxide.

The source of silica is an oxidation product from the silicon-based ceramic, and the source of rare earth oxide is the second element already existing in the silicon-based ceramic glow plug. The rare earth oxide is introduced purposely during the formation of the silicon-based ceramic to assist the densification of silicon-based ceramic in the silicon-based ceramic fabrication process.

In the procedural steps of the preferred embodiment of the process of this invention, the glow plug was first formed from an ytterbium-doped silicon nitride material supplied by Kyocera Inc. As previously stated, the ytterbium was doped to assist in the densification of silicon nitride in the silicon nitride fabrication process. Thus, the ytterbium is utilized by Kyocera Inc. as a densification aid, i.e. a sintering aid.

The preselected glow plug portion desired to be coated with a corrosion inhibiting material is first cleaned. This cleaning can be accomplished by various methods and materials. Preferably, the glow plug portion is impacted with abrasive grit such as alumina, for a period of time sufficient for removing oxidized particles, dirt and other foreign material from the glow plug portion and thereafter contacting the glow plug with a solvent. The glow plugs are grit-blasted with alumina particles prior to any oxidation reaction to eliminate the preexisting surface silica. Such process is well known in the art.

After cleaning, the glow plug portion is securely placed in a fixture where the power source is then adjusted to deliver a current desirably in the range of about 3.5 amps to about 4.5 amps, and preferably, at about 4.0 amps. The power source is also adjusted to deliver voltage within the range of about 15 volts to about 17 volts. Current less than about 3.5 amps and voltage less than about 15 volts is undesirable because it would result in an insufficient surface temperature of the glow plug.

In the preferred embodiment, the temperature is in the range of about 1400–1500, more preferably, about 1450 degrees C. Current greater than about 5.0 amps and voltage greater than about 17 volts would be undesirable because there would be occurrence of damage of the heating element in the glow plug.

The power source is then energized to resultingly produce a temperature in the range of about 1400–1500 degrees C., more preferably, about 1450 degrees C. The power source is needed to provide heat and thus, the desired temperature, to drive the oxidation reaction. Such process is well known in the art.

The time needed to energize the glow plug to its optimum level is in the range of about 6–12 hours, more preferably, about twelve hours.

Alternatively, the desired temperatures on the surface of the glow plug may be achieved by an external heat source. This is done by placing the silicon nitride portion of the glow plug into a temperature controllable furnace capable of generating high temperatures and raising the temperature in the range of about 1400–1500 degrees C. The time needed is in the range of about 6–12 hours, more preferably, about twelve hours.

This is the technique that would be utilized to form the ytterbium silicate coating on components other than a glow plug such as turbine blades, turbocharger rotors, and the like.

In the preferred embodiment, the oxidation reaction, which produces silica, and the reaction between silica and ytterbium occur simultaneously. After oxidation, the ytterbium migrates to the surface of the silicon nitride and reacts with newly formed silica and produces ytterbium silicate. The ytterbium-silicate product is very dense and uniform. It acts as the coating on the glow plug.

EXAMPLE 1

Glow plugs were grit-blasted with alumina particles prior to any oxidation reaction to eliminate the preexisting surface silica. After cleaning, the glow plug portion was securedly placed in a fixture. Then, the glow plug was energized to reach a temperature of 1450 degrees C. for 12 hours for the oxidation reaction process, which produced silica. The reaction between the silica and the ytterbium originally contained within the silicon nitride occur simultaneously.

The ytterbium in the silicon nitride migrated to the surface of the silicon nitride portion and reacted with the newly formed silica to produce the ytterbium-silicate coating layer on the silicon nitride glow plug. The ytterbium-silicate product had a thickness of 5 microns and was very dense and uniform. The ytterbium-silicate product acts as the corrosion and erosion resistant coating on the glow plug.

INDUSTRIAL APPLICABILITY

The rare earth silicate coating of the present invention desirably seals a component from the high temperature, corrosive environment in which it exists. In an engine environment, the engine component is sealed from the detrimental environment generated by the use of alternative fuels.

The process embodied in the invention results in very good adhesion of the rare earth silicate coating to the surface of the silicon-based ceramic component. The process embodied in the invention also results in good continuity of the rare earth silicate across the surface of silicon-based component, resulting in uniform corrosion inhibiting characteristics.

We claim:

1. A method of forming a rare-earth silicate surface treatment comprising:

preparing a silicon-based component, wherein said silicon-based component includes a rare earth doped ceramic;

heating said silicon-based component to about 1100 degrees Centigrade or greater to form silica on said silicon-based component; and reacting said rare earth doped ceramic with said silica so as to form a rare earth silicate coating, wherein said silicon-based component includes molybdenum disilicide.

2. A process for coating a silicon-based component, comprising:

forming a silicon-based component, wherein said silicon-based component includes a rare earth-doped ceramic disposing a heating element within the silicon-based component;

raising the temperature of the heating element to heat the silicon-based component from within;

forming a silica layer on the silicon-based component by oxidizing the silicon-based component;

reacting the rare earth-doped ceramic of the silicon-based component with the silica layer to form a rare earth silicate coating on the silicon-based component.

3. The process of claim 2, further including raising the temperature of the heating element to between about 1400 degrees Centigrade to about 1500 degrees Centigrade.

4. The process of claim 3, further including maintaining the temperature of the heating element at about 1400 degrees Centigrade to about 1500 degrees Centigrade for between six to twelve hours.

5. The process of claim 2, wherein the heating element is a heating element of a glow plug for an engine.

6. The process of claim 2, wherein raising the temperature of the heating element increases the temperature of the silicon-based component to at least 1100 degrees Centigrade.

7. The process of claim 6, wherein raising the temperature of the heating element increases the temperature of the silicon-based component to at least 1250 degrees Centigrade.

8. The process of claim 2, wherein the silicon-based component includes silicon-nitride.

9. The process of claim 2, wherein the silicon-based component includes silicon carbide.

10. The process of claim 2, wherein the rare earth silicate coating includes ytterbium silicate.

11. The process of claim 2, wherein the rare earth silicate coating includes yttrium silicate.

12. The process of claim 2, wherein the rare earth silicate coating includes lanthanum silicate.

13. The process of claim 2, wherein the rare earth silicate coating has a thickness of between about 1 micron and about 5 microns.

* * * * *